Aug. 25, 1964

W. C. JOHNSON 3,145,456

METHOD OF MANUFACTURING FINNED STRUCTURE

Original Filed June 21, 1956

INVENTOR.
WALLACE C. JOHNSON
BY Robert H. Bachman

ATTORNEY

United States Patent Office 3,145,456
Patented Aug. 25, 1964

3,145,456
METHOD OF MANUFACTURING FINNED STRUCTURE
Wallace C. Johnson, St. Davids, Pa., assignor to Olin Mathieson Chemical Corporation, East Alton, Ill., a corporation of Virginia
Original application June 21, 1956, Ser. No. 592,785. Divided and this application Oct. 11, 1960, Ser. No. 66,373
2 Claims. (Cl. 29—157.3)

This invention relates to a new and improved finned or reinforced panel or sheet structure and to its method of manufacture. This application is a division of copending application Serial No. 592,785 filed June 21, 1956.

In the fabrication of various articles of manufacture such as construction panels including those of sheet metal, for example, and particularly in the manufacture of heat exchangers such as radiators and like, it is frequently necessary to provide ribs or fins either for the purpose of improving the strength of such articles or, as in heat exchangers, for the purpose of facilitating the transmission of heat, or for both purposes. Although flanges and fins are desired in articles of this general type, the assembly of fins or reinforcing flanges poses a difficult manufacturing problem. For example, the assembly of fin stock with the hollow fluid conducting members of a heat exchanger device is a difficult and expensive operation. In the manufacture of heat exchangers especially, assembly of flat or plate type tubes or panels with a stack of superposed perforated fin sheets or with corrugated fin stock is a relatively slow operation. Such assembly is further complicated by the need for making good contact between the tube and the fins for proper heat conduction as well as for securely assembling the parts.

Therefore, one of the objects of this invention is the provision of a new and improved relatively thin and economical panel structure having integral flanges or fins suitable for various purposes such as strengthening or fastening or heat exchange. Another object is the provision of a new and improved heat exchange tube structure with integral fins. Another object is the provision of a structural panel having both internal passageways or corrugations together with external ribs and/or connecting flanges. Still another object is the provision of a new and improved method of forming such structures characterized by economy and freedom from poorly secured parts such as are responsible for easily broken or poorly conductive joints. Other objects and advantages will become apparent from the following description of various embodiments of the invention when taken together with the accompanying drawings in which:

Figure 1:
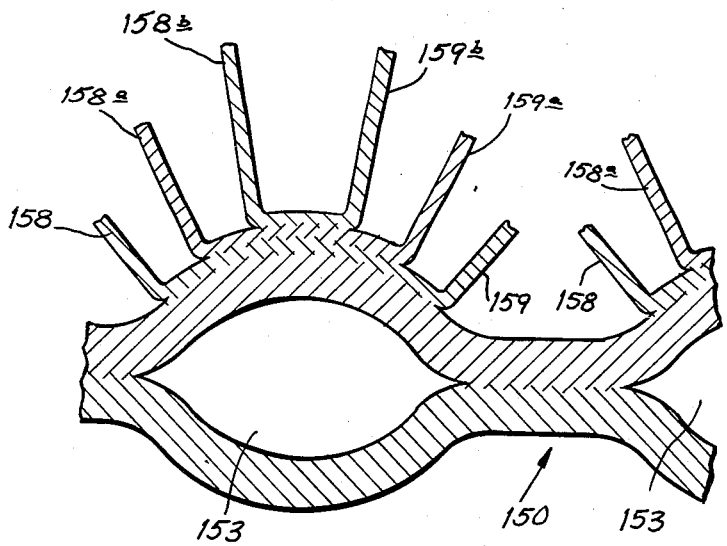
FIG. 1 is a cross sectional view of one embodiment.

In accordance with this invention there is made a panel or sheet having many integral and closely spaced, short appendages each superadded to a basic starting sheet and protruding at a rather sharp right angle from at least one side in cooperating association with each other and/or with distentions or corrugations in the basic sheet. By sharp is meant a 90° bend on a radius of not more and preferably less than the order of the thickness of the sheets bent. The sharper the bend, the better the heat exchange and stiffness. By short is meant an empirically determinable protrusion not in excess of that beyond which neither heat exchange nor stiffening is efficient. Short protrusion also allows closer spacing and more appendages per unit area. These appendages take the form of flanges, ribs or fins preferably thinner than the base sheet of the panel and extend either longitudinally or transversely with respect to the panel. These appendages are formed from one or more outer component layers on either one or both sides of the basic starting sheet. The appendages may protrude only from one side for certain purposes while for others they extend preferably from both surfaces. Those on opposite surfaces extend either transversely or in overlapping relationship with each other or with the distended portions. In any event the optimum arrangement is achieved when an array of appendages is associated with another such arrangement or hollow corrugated portions. In the latter arrangement the ribbed or finned panel has distended passageways which may advantageously carry other structures or substances such as heat exchanger fluid. Preferably the distended passageway portions carry the appendages. Thus the invention contemplates an integrally finned and interfacially cavitated panel.

Such a panel is made by providing a partially laminated but otherwise solid blank integrated from starting sheets including a divisible outer layer by pressure welding leaving, however, strata at which the blank is not integrated and then peeling back an outer component layer at an edge portion formed opposite a laminated area of the panel. More specifically each of the edge portions at which division of the surface component layer occurs and at which fin or rib erection is to commence is provided by the contiguous edges of separate strips laid side by side to make up an outer or surface layer over an adjacent layer.

According to one aspect of the invention, two or more strata of interfacial parting substantially parallel to the outer faces are employed and at least one stratum of interfacial separation is subjected to internal pressure so as to form fluid conduits in the panel by distension while leaving the other stratum or the outer strata in the laminated areas for peeling to erect the external fins. Thus with two strata of interfacial parting, one may be subject to distension while the other is peeled. In a three strata arrangement the inner stratum is distended while both the outer are peeled. Prior to peeling, a hollow panel may be subjected to distension to facilitate peeling in the outer layers.

The various component sheet metal layers of the panel are unified in certain areas while maintained separate to form laminated areas by pressure unification accompanied by selective weld prevention in accordance with the principles set forth in U.S. Patent No. 2,690,002 issued to L. H. Grenell. In fabrication at least two component sheets of base material, such as metal, are first laid up together with suitable intervening patterns of any suitable stop-weld or weld preventing material such as one including colloidal graphite or the like. This assembly is then pressure unified, except at the interfacial internal portion occupied by stop-weld, by a suitable metal working step such as rolling in which the thickness of the assembly is reduced as it undergoes elongation. Generally, the pattern consists of an array of spaced parallel stripes or bands of weld preventing material applied in a suitably thin layer.

At least one of the outer or surface component layers or sheets of the base material is initially subdivided and then subjected to outward bending so as to erect the fins or ribs. Division is done in the areas overlying or underlying the separation material. For example, with respect to longitudinally extending stripes of such separation material, a surface layer of base material is divided longitudinally along the midplane. This may be done by forming the component outer layer of a number of contiguous strips laid side by side in superposition with the adjoining component layer. When separate strips are initially employed it has been found advantageous to accomplish the pressure unification by rolling in the direction of the strips rather than across them.

When internal cavities are desired, another predetermined pattern of separation material is applied in a stratum adjoining or intervening the aforementioned stripes or bands of separation material. The pressure unified blank with such additional pattern is then subjected to fluid pressure internally along the appropriate pattern in a suitable manner so as to permit erection of the desired passageway structure by distension of portions of the sheet metal structure.

When the panel is cavitated each individual fin preferably is unified with an evenly distended cavitated portion, but any one individual fin may be integrated either along a distended tube portion or along a solid portion next to a tube just so long as the fin is associated in parallel with a corrugated tube portion. Where a fin is to extend across tube passages the intervening space on the sheet preferably is also cavitated until distended to substantially the same degree as the adjacent tube section so as to form a substantially even surface portion on which the fin is integrated with the panel and from which the individual fins then may project, each remaining undistorted.

In accordance with one preferred embodiment of this invention, there is provided a plate type of heat exchanger tube having primary heat exchanger fluid passageways extending throughout the length of the panel and having external fins pressure unified with the walls of said fluid passageway portions of the panel. Such a panel is characterized by relatively complete freedom from joints containing extraneous brazing or soldering material. The external fin structure may be of either pair or single type, it being essential only that a secondary heat exchanger fluid be admissible to the external surface of the tube walls and the surfaces of the fins in intimate heat exchange relationship. The fins may be disposed in any direction with respect to the primary or internal heat exchanger fluid passageway, but for certain heat exchange applications it is preferred that the fins be disposed in a direction transverse with respect to the axis or direction of the internal passageways. The internal passageways may consist of a single relatively wide flat passageway or a row of spaced parallel passageways. When the internal passageway consists of a number of separate passageways it is preferred that at intervals these be interconnected by transversely extending passageways. Furthermore, it is preferred that the fin structure be pressure unified only to the evenly distended wall portions of the internal passageways. The fin structure may be provided in some instances to only one side of the heat exchanger panel structure while in other instances it is advantageous that the fin structure extend from both sides of the panel.

Figure 2:
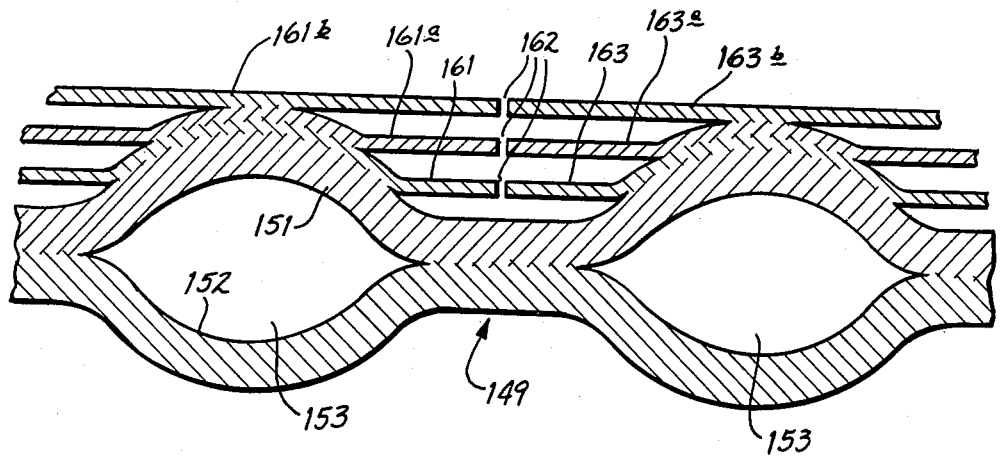
FIG. 2 is a cross sectional view taken at a stage in the manufacture of this embodiment.

FIGS. 1 and 2 show the formation of an article which is provided with a multiplicity of fins on the walls of the passageway portion instead of on the solid web portion of the panel. As shown in the drawing the panel 150 is cavitated at 153 and has an integral set of fins on a distended wall of the cavitated portion 153 all running parallel to the cavity. The cluster of six thin fins are all pressure unified to the top of the distended wall and extended directly outwardly therefrom. The fin cluster consists of the primary pair of fins 158 and 159, the secondary pair 158a and 159a, and the tertiary pair 158b and 159b. These multiple lateral fins are especially desirable where increased heat transfer is needed. It will be understood that where the tube passageways are more widely spaced another fin cluster can also be integrated with the solid portion of panel 150 between the passageways.

As shown in FIG. 2 a pack structure is formed comprising two basic starting members 151 and 152 and three outer component strips such as 161, 161a and 161b and other contiguous outer component strips such as 163, 163a and 163b separated from the first group of outer component layers at the disjuncture 162. These various layers are pressure unified in certain portions so as to form a structure, all layers of which are integrated except at certain internal areas or strata at which the blank is laminated and adapted to be separated for form internal passageways and outwardly extending fin portions spaced from each other. In the stage of manufacture shown in FIG. 2 the blank 149 has been subjected to internal pressure to generate the tube passageways 153. This also separates and partially peels the edge portions of the outer component layers adjacent the disjuncture preparatory to bending these edge portions upwardly and outwardly to form the fin clusters.

The article of FIG. 1 is characterized by fins or ribs rooted to the distended walls of the cavitated portion of the panel and is also characterized by compound fins formed from two or more outer component layers.

It is to be noted that to facilitate provision of ribs or fins of desired proportion, the outer component sheets for any embodiment are advantageously thinner than the inner component or starting layers. But especially with compounded fins, the outer component sheets or strips from which the fins are to be formed should be considerably thinner than the inner component sheets which form the foundation or basic portion of the panel.

In no event, however, are the fins formed by bending any portion of the relatively heavy basic layer or layers of the panel which was found to cause a severe loss in rigidity and with less improvement in heat exchange than that obtainable in accordance with this invention.

Although rectilinearly extending fins have been shown and described in connection with various specific embodiments, curvilinearly and continuously extending fins may be employed. But regardless of the way the fins extend along the panel, all ribs must protrude outwardly at a relatively sharp right angle with the surface along which the ribs extend. This sharp right angular protrusion is important for realization of the various hereinbefore noted advantages and notably that of stiffening. If the bend is not sharp or is at a lesser angle or amounts to a mere rounded turning in, the panel will be found to be weakened as a result of thinning instead of being reinforced as a result of the presence of the rib or fin members.

While a number of specific embodiments now believed to be preferred have been described in the foregoing, it will be understood that the invention is not limited thereto and that further changes and modifications may be made by those skilled in the art without departing from the spirit and scope of this invention as set forth in the appended claims.

Having thus described the invention, I claim:

1. The method of making a finned heat exchanger plate comprising superposing a pair of inside component sheets with weldable surfaces in juxtaposition with an intervening first pattern of weld preventing material applied to one of said component sheets, said pattern including stripes spaced from each other and from the lateral edges of said sheets, applying a plurality of edge-to-edge contiguous outside component sheets to the outside surface of at least one of said pair of inside sheets with a second pattern of weld preventing material consisting of spaced bands each extending from one edge to an opposite edge intervening between said outside surface and the applied outside sheet along and adjacent said contiguous edges which form lines of subdivision of said outside component sheet, unifying adjacent component sheets together except at the areas occupied by said pattern of weld preventing material to form a tube sheet having exposed along its peripheral edges the ends of said bands of said second patterns, bending those portions of said outside component sheets adjacent each of said lines of subdivision outwardly to form integral fins and then applying fluid inflation pressure along said first pattern of weld preventing material so as to erect heat exchanger fluid passageways in said plate structure extending from adjacent one end of the tube sheet to the other end of the tube sheet.

2. The method of making a finned tubular sheet structure comprising in combination the steps of interposing weld-inhibiting material to define a tube pattern between adjacent surfaces of superposed component sheets, superposing at least one component strip in superposed relationship with said sheets on at least one of the outermost faces of said sheets with weld-inhibiting material interposed in a fin pattern between all adjacent surfaces externally of said sheets except in an area thereof spaced from and coextending with a pair of opposite edges of said strip, forming a tube sheet by welding all adjacent surfaces of said sheets and strip in their areas not separated by weld-inhibiting material, and bending the unwelded portions of said strip outwardly to form integral fins extending externally out of said tubular structure.

References Cited in the file of this patent

UNITED STATES PATENTS

| | | |
|---|---|---|
| 2,261,137 | Brown | Nov. 4, 1941 |
| 2,375,334 | Valyi | May 8, 1945 |
| 2,766,514 | Adams | Oct. 16, 1956 |
| 2,941,282 | Fromson | June 21, 1960 |
| 2,944,328 | Adams | July 12, 1960 |
| 2,999,305 | Reynolds | Sept. 12, 1961 |

FOREIGN PATENTS

| | | |
|---|---|---|
| 671,516 | Great Britain | May 7, 1952 |